(12) United States Patent
Byrd

(10) Patent No.: US 6,681,807 B1
(45) Date of Patent: Jan. 27, 2004

(54) ASYMMETRIC BIDIRECTIONAL FLOW DEVICE

(75) Inventor: Gary N. Byrd, Donahue, IA (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/194,243

(22) Filed: Jul. 15, 2002

(51) Int. Cl.⁷ .................................................. F15D 1/02
(52) U.S. Cl. ............................. 138/43; 138/45; 138/46
(58) Field of Search .............................. 138/40, 43, 42, 138/45, 39, 46

(56) References Cited

U.S. PATENT DOCUMENTS

| | | | | |
|---|---|---|---|---|
| 1,311,737 A | * | 7/1919 | Allen | 138/40 |
| 1,784,673 A | * | 12/1930 | Loepsinger et al. | 138/44 |
| 1,812,916 A | * | 7/1931 | Zerk | 138/42 |
| 3,367,362 A | * | 2/1968 | Hoffman | 138/45 |
| 3,983,903 A | * | 10/1976 | Kuehn, Jr. | 138/40 |
| 4,327,058 A | * | 4/1982 | Tillinghast | 422/232 |
| 4,450,718 A | * | 5/1984 | Hartemink | 138/42 |
| 4,826,510 A | * | 5/1989 | McCombs | 55/179 |
| 4,971,117 A | * | 11/1990 | Hendrickson | 138/41 |
| 5,499,871 A | * | 3/1996 | Ulrich et al. | 138/42 |
| 5,588,635 A | * | 12/1996 | Hartman | 138/44 |
| 6,068,680 A | * | 5/2000 | Kulish et al. | 95/98 |
| 6,423,275 B1 | * | 7/2002 | D'Souza | 422/129 |

* cited by examiner

*Primary Examiner*—James Hook
(74) *Attorney, Agent, or Firm*—Lowe Hauptman Gilman & Berner, LLP

(57) ABSTRACT

A method and apparatus for receiving a flow of fluid and restricting the flow through a device are described. The apparatus includes an insert having a shaped surface including at least one through-hole located off-center. The shaped surface may be a bell-shaped curve in cross-section. The method includes supplying a flow of fluid to one side of the apparatus, redirecting a portion of the flow of the fluid onto itself, and directing the flow to the at least one through-hole.

10 Claims, 4 Drawing Sheets

ASYMMETRIC BIDIRECTIONAL FLOW DEVICE

FIELD OF THE INVENTION

The present invention relates to a fluid flow device having asymmetric flow properties, and more particularly, to an asymmetric bidirectional fluid flow device for use in gas generation devices.

BACKGROUND ART

Molecular sieve pressure swing adsorption (PSA) oxygen concentrators are currently in use in home healthcare, industrial and aircraft oxygen applications for the purpose of generating oxygen. An exemplary PSA oxygen concentrator 8 is shown in FIG. 1a and includes an input/output (I/O) valve 10, connected to a bed 12, and depending on the position of valve 10, alternately receives air to be concentrated from a source (not shown), e.g., a compressor, and vents gases from the bed. Bed 12 contains a molecular sieve 30, i.e., an adsorptive material, for adsorbing non-oxygen constituents of the received air, e.g., water and nitrogen, and the bed is, in turn, connected to a check valve 14 to provide the generated product gas, e.g., oxygen and argon, for a particular application.

In operation, the feed air, i.e., the gas entering I/O valve 10 from a source, is supplied to bed 12 wherein unwanted gas constituents are captured in the adsorptive material, e.g., zeolite. The remaining gas exits bed 12 at port 15 and flows past check valve 14 as the product gas. Cyclically, the adsorptive material in bed 12 is regenerated, i.e., emptied of the captured unwanted gas constituents, by reversing the flow of air through bed 12. Thus, I/O valve 10 is manipulated so that entering gas from the source is blocked and gas is vented from bed 12 emptying the unwanted gas constituents from the adsorptive material. Typically, a portion of the product gas is used to backflush bed 12, i.e., reverse the flow of gas to remove the unwanted constituents, by providing the gas into port 15 and through bed 12 to vent through I/O valve 10. Upon emptying the unwanted gas constituents, the I/O valve 10 is reset to receive feed air and prevent approximately 30–50 psi, than the vent gas, e.g., approximately 1 psi, the fluid flow is known as asymmetric to persons in the art.

To improve the overall operation of PSA systems, most PSA systems use two or more beds of adsorptive material which are pressurized in a cyclic regenerative process. Thus, FIG. 1a includes a second I/O valve 16 connected to a second bed 18 having a port 19, in turn, connected to a second check valve 20. Additionally, a purge gas connection 22 connects the output connection 17 between first bed 12 and first check valve 14 to the output connection 21 between second bed 18 and second check valve 20.

As shown in FIG. 1a during a typical oxygen generating PSA cycle, pressurized gas flows through the first bed 12 of molecular sieve, i.e., adsorptive material, via I/O valve 10 while the second bed 18 is vented to atmosphere through I/O valve 16 (indicated by a dashed line). The pressurized first bed 12 adsorptive material preferentially adsorbs unwanted constituents such as water and nitrogen, allowing oxygen and argon to pass through to check valve 14. A portion of the oxygen-enriched gas passes through a check valve 14, where it is used as product gas, and the rest passes through purge gas connection 22 to back flush nitrogen and water from second bed 18 to atmosphere.

Then as shown in FIG. 1b, before first bed 12 becomes completely saturated with unwanted constituents, the first and second I/O valves 10, 16 are switched to supply feed air to second bed 18 and vent first bed 12 to atmosphere (shown as a dashed line). Second bed 18 then becomes the oxygen producing bed and first bed 12 is regenerated by venting to atmosphere via I/O valve 16.

Venting first bed 12 to atmosphere and back flushing with oxygen enriched gas completes the regeneration of the first bed. This cyclic regeneration process repeats continuously to enable the production of a controlled amount of gas, e.g. oxygen. Because the concentrator 8 uses the same flow line connecting bed 12 to I/O valve 10 for both inflow of feed air and outflow of exhaust gas, if the flow line for venting beds 12, 18 to atmosphere through I/O valves 10, 16 respectively is restricted or narrowed in order to reduce the velocity of the feed air, longer cycle times are required to adequately purge the beds 12, 18 which reduces the amount of product gas which can be produced from a given source of supply or feed air and a fixed amount of molecular sieve or adsorptive material.

Typically, PSA systems operate with inlet air pressures in the range of 30 to 50 psig and outlet pressures of less than 50 psig. In many cases, the PSA systems are optimized to reduce air consumption thereby enabling the use of smaller, lighter compressors.

In some applications, oxygen generated by the PSA oxygen concentrator is supplied to other medical devices, such as ventilators and anesthesia machines. In these applications, the product gas pressure, i.e., the pressure of the gas produced by the PSA oxygen concentrator and provided to the other medical devices, needs to be above the typical 50 psig outlet pressure to insure proper operation of the other medical devices. One previous method of providing gas at the required pressure is post-compressing the PSA oxygen concentrator product gas to the required pressure using a compressor. This prior approach is expensive, requiring the acquisition, maintenance, and use of a compressor in addition to the air source, and introduces additional failure points or modes.

Another approach is to pressurize the zeolite, i.e., the adsorptive material in the beds 12, 18, with higher inlet pressures from I/O valves 10, 16 in order to achieve the desired outlet pressure of the product gas. One of the disadvantages of this approach in the past has been the destruction of the zeolite during the pressure swing adsorption process at high pressures. This is particularly true at the inlet end 12A, 18A of the bed 12, 18 where the high velocity gas impinges on the molecular sieve 30. The impingement force is enough to cause failure of the zeolite or filtering media which is part of the molecular sieve 30 retention and a grinding action which grinds the sieve granules into a powder. The powder disadvantageously contaminates connecting lines and other components. Eventual dusting of the granules leads to bed failure.

Some manufacturers have sintered the zeolite in plastic pellets to prevent dusting, but this approach is expensive and requires additional weight and volume. Another approach has been to restrict the inlet and outlet flow of gas into the molecular sieve beds but this adversely affects the performance of the beds. In particular, restriction of the exhaust cycle, i.e., regeneration and venting of a bed, prevents complete regeneration of the beds and leads to performance degradation.

DISCLOSURE/SUMMARY OF THE INVENTION

It is therefore an object of the present invention to provide a method and apparatus for enabling an asymmetric flow of fluid through a device.

Another object of the present invention is to enable an asymmetric, bidirectional flow of fluid through a device.

Another object of the present invention is to reduce the flow of fluid through a device in one direction while maximizing the flow of fluid through the device in another direction.

The above described objects are fulfilled by a method and apparatus for receiving a flow of fluid and restricting the flow of the fluid through a device. An apparatus aspect includes an insert having a shaped surface including at least one through-hole located off center. The shaped surface may be a bell-shaped curve in cross-section or a parabaloid, semi-spheroid, or elliptoid.

A method aspect includes supplying a flow of fluid to one side of an apparatus having a shaped surface and at least one through-hole located off-center, redirecting a portion of the flow of the fluid onto itself, and directing the flow to at least one through-hole.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIGS. 4a–4c are a top view, side section view, and another side section view, respectively of a flow deflector cap used in the bed of FIG. 2.

BEST MODE FOR CARRYING OUT THE INVENTION

Figures 1A, 1B:
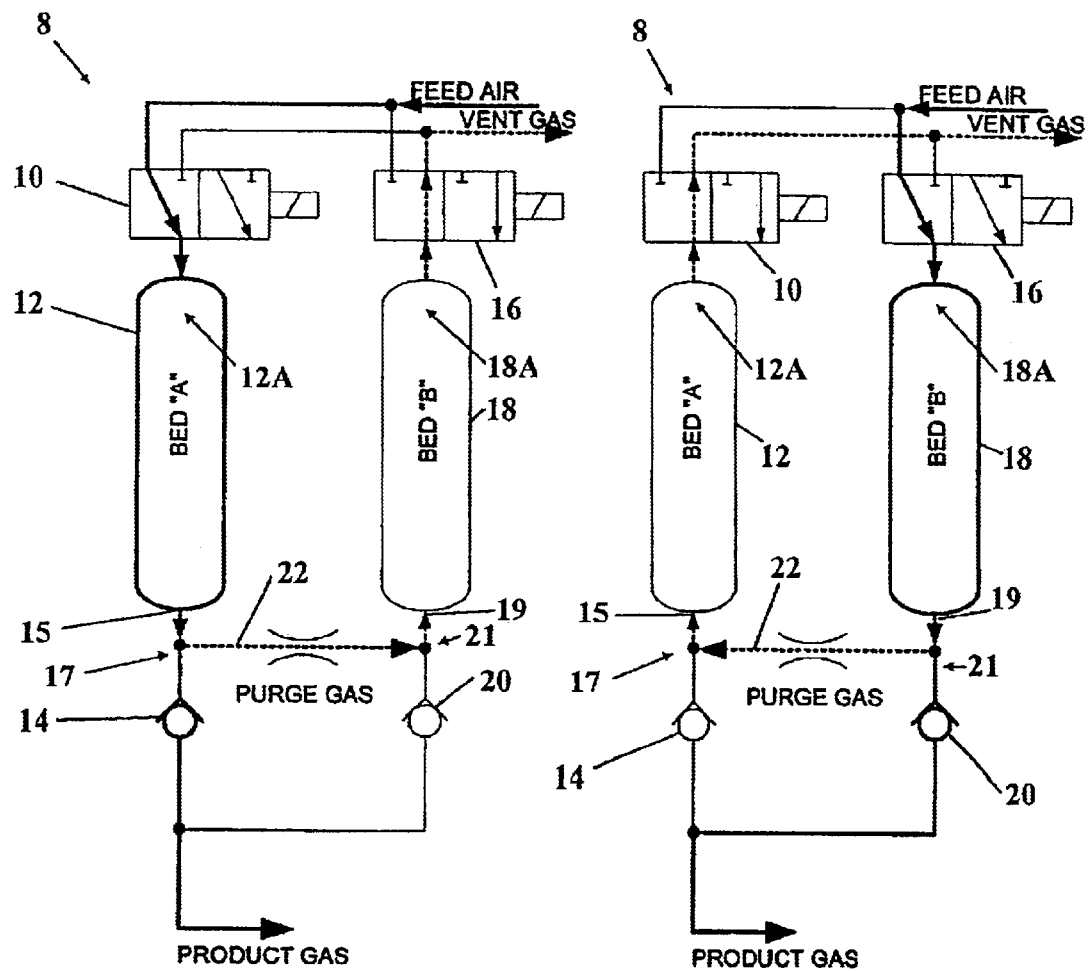
FIGS. 1a and 1b are high level diagrams of a prior art PSA oxygen concentrator in operation.
Figure 2:
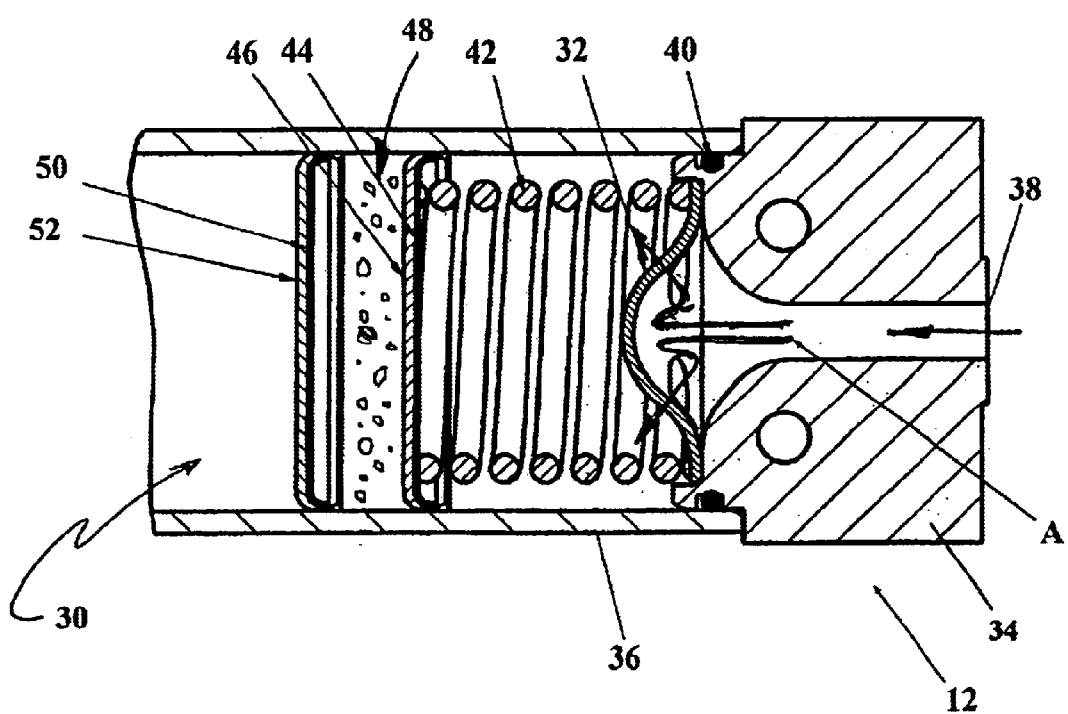
FIG. 2 is a longitudinal sectional view of a portion of a bed that can be used in the PSA oxygen concentrator of FIG. 1a in a position of receiving feed air.
Figure 3:
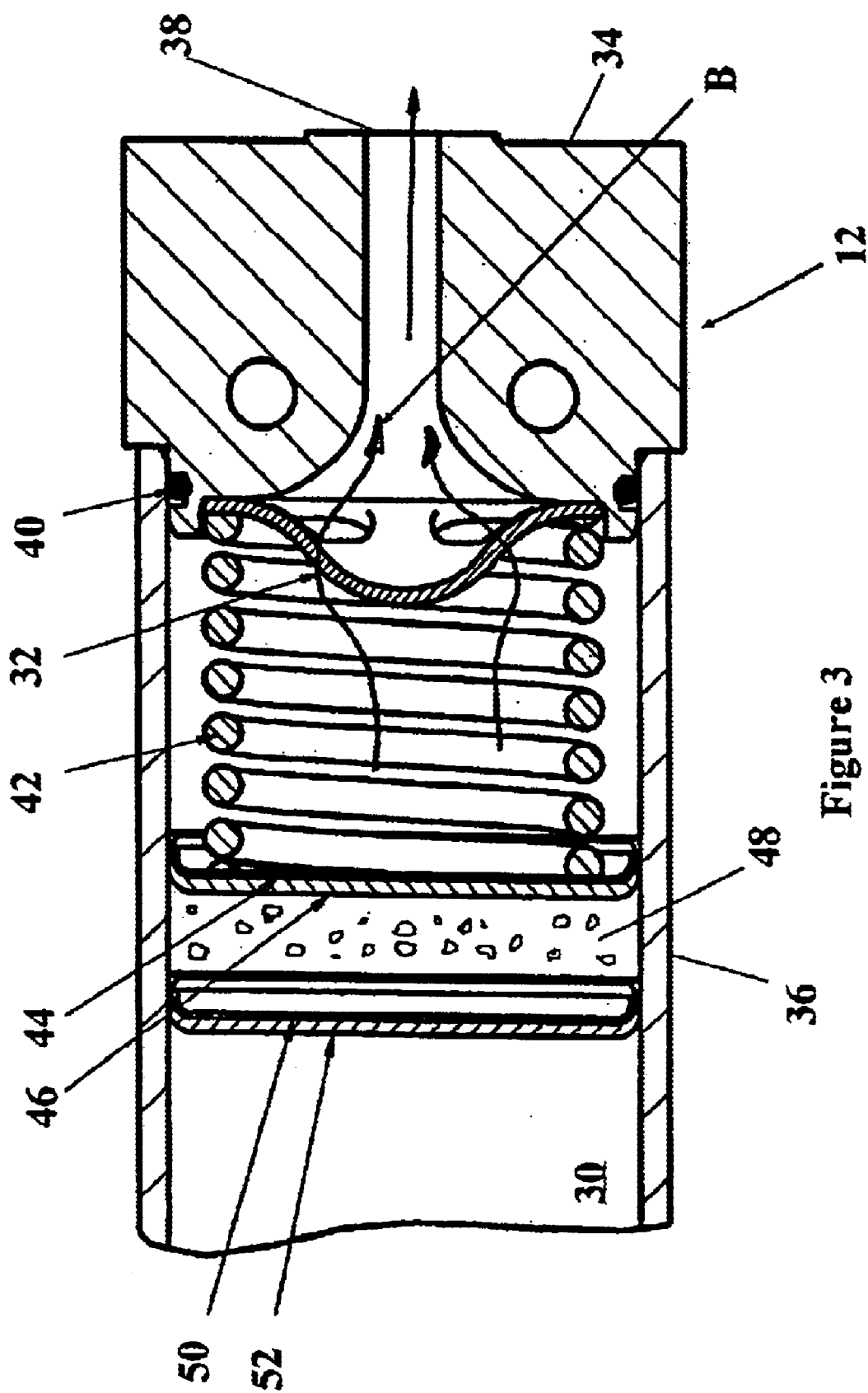
FIG. 3 is a longitudinal sectional view of a portion of a bed in that can be used in the PSA oxygen concentrator of FIG. 1b in a position of venting unwanted constituents.

The present invention relates to a device for controlling a fluid flow, e.g., of a gas or feed air, into and out of a molecular sieve 30 which may be the adsorptive material of a bed, e.g., bed 12 of FIG. 1a, of an oxygen concentrator to reduce degradation of the molecular sieve at high inlet pressures without affecting performance of the oxygen concentrator. As shown in FIGS. 2 and 3, the device includes a flow deflector cap 32 which due to its shape restricts direct impingement of high velocity inlet gas upon the inlet of the molecular sieve 30 of bed 12 (indicated by direction arrow A in FIG. 2) while providing very little restriction to the flow of the exhaust gas (indicated by direction arrow B in FIG. 3).

FIGS. 2 and 3 are side views of an inlet portion of bed 12 of FIG. 1 in operation. FIG. 2 is a view showing the flow of gas into bed 12 and FIG. 3 is a view showing the venting of gas out of bed 12.

As shown in FIG. 2, the inlet end 12A of bed 12, i.e., the end connected to I/O valve 10, includes a bed cap 34 attached to a bed tube 36. Typically, bed tube 36 is a cylindrical tube made of aluminum. Bed cap 34 is typically threaded onto bed tube 36 and includes a passage 38 for receiving and venting gas to/from bed tube 36. Alternatively, bed cap 34 may also be bolted onto bed tube 36. Another bed cap (not shown) is attached at the other end of bed tube 36. An O-ring 40 is positioned between bed cap 34 and bed tube 36 sealing the bed cap to the bed tube.

Deflector cap 32 is positioned inside bed tube 36 and next to an interior surface of bed cap 34 when the cap is attached to the bed tube 36. A spring 42 is longitudinally positioned within bed tube 36 and between deflector cap 32 and a perforated plate 44. One end of spring 42, under longitudinal compression, holds deflector cap 32 in place against bed cap 34 by applying pressure to the deflector cap. The other end of spring 42 applies pressure to the perforated plate 44 urging the plate toward the other end of bed tube 36 away from bed cap 34.

Perforated plate 44 is a cylindrical-shaped disc fit to the inner shape of bed tube 36 and having a side facing and receiving spring 42. Plate 44 includes multiple through-holes allowing the passage of gas through the bed tube 36. A felt pad 46 is positioned next to the downstream side of perforated plate 44 and is similarly shaped to the plate. Felt pad 46 acts as a fine mesh to prevent dusting, i.e., distribution of dust generated by movement and grinding of zeolite, and an activated alumina 48 is positioned adjacent the felt pad. Felt pad 46 also cushions the activated alumina 48 while applying pressure to the alumina.

Activated alumina 48 is generally made of small diameter, e.g., one-eighth inch diameter, spherical balls of activated alumina reducing dusting because of its higher crush strength in comparison to the zeolite of molecular sieve 30. Activated alumina 48 also serve to absorb water from the feed air.

A second perforated plate 50 and felt pad 52, identical to the above-described perforated plate 44 and felt pad 46, is positioned adjacent to activated alumina 48. Felt pad 52 cushions the molecular sieve 30, i.e., zeolite, and further transfers pressure from spring 42 to sieve 30 in order to retain the sieve 30 in place and further prevent or reduce dusting.

Thus, as described above, spring 42 applies pressure directly to hold in place deflector cap 32 and applies pressure via first perforated plate 44, felt pad 46, activated alumina 48, second perforated plate 50, and second felt pad 52 to hold in place molecular sieve 30.

FIG. 3 is structurally identical to FIG. 2, but shows the venting flow B of gas out of bed 12 past the deflector cap 32.

In operation, the high velocity gas flow into bed 12, which occurs at the beginning of the PSA cycle (as indicated by A in FIG. 2), strikes an inside surface 70 (FIG. 4b) of cap 32 and is diverted or forced back on itself before passing through openings 64–67 (FIG. 4a) in cap 32 (more fully described below) and into bed 12. The impact of gas A on cap 32 advantageously slows the high velocity gas by diffusing it and reduces the stress on the molecular sieve 30, i.e., zeolite, of bed 12. During the exhaust cycle (FIG. 3), the venting gas B strikes the curved outer surface 72 of cap 32 allowing it to flow through openings 64–67 in cap 32 and exhaust with very little flow restriction. Minimizing flow restriction ensures that bed 12 can be adequately purged and regenerated at the elevated pressures used with medical devices.

Figures 4A, 4B:
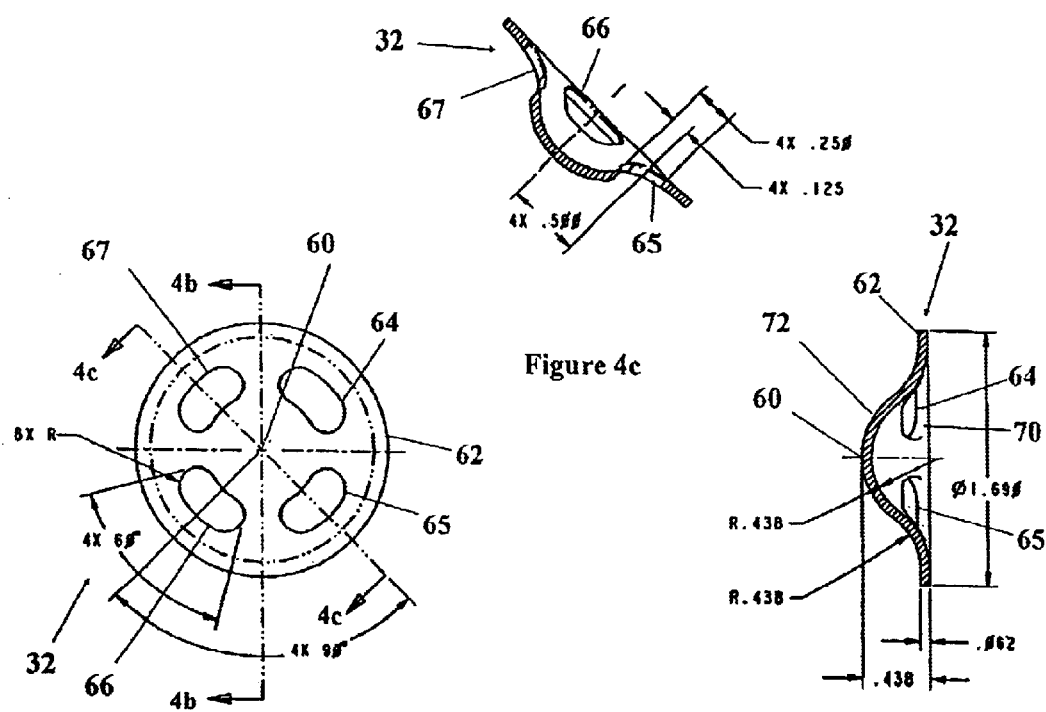

Deflector cap 32 is now described in detail with reference to FIGS. 4a–4c. FIG. 4a is a top view of deflector cap 32. Deflector cap 32 is a circular-shaped disc (in plan view in FIG. 4a) having a center point 60 and an outer circumference 62.

Four through-holes 64, 65, 66, and 67, generally kidney-shaped with the concave side facing toward center point 60, are uniformly circumferentially distributed in deflector cap 32. Through-holes 64–67 are radially located between center point 60 and outer circumference 62, e.g., approximately midway between the center and the outer edge of deflector cap 32. As described above, the through-holes 64–67 allow gas, i.e., feed and vent air, to pass in a bidirectional fashion through deflector cap 32.

Through-holes 64–67 each encompass an angle of approximately sixty degrees at a uniform radius. The combined angle of coverage of through-holes 64–67 is 240 of the possible 360 degree area of the disc 32 at the particular radius.

FIG. 4b is a side view of deflector cap 32 through a section A—A of FIG. 4a. As shown in FIG. 4b, cap 32 has a first generally concave side 70 and a second generally convex side 72. Cap 32 protrudes as a bell-shaped curve in cross-section and is generally paraboloidal extending center point 60 into the interior of spring 42 when installed in bed 12. Exhaust gas, during a venting or regeneration cycle, impacts convex side 72 and flows in a generally unrestricted manner through through-holes 64–67 to concave side 70 and then exits bed 12 via passage 38 in bed cap 34. In an alternate embodiment, the shape of cap 32 may be semi-spherical, hemi-spherical, or elliptoidal depending on the reduction of velocity and amount of turbulence desired for the feed air.

A portion of the high velocity feed gas passing through passage 38 impacts the concave side 70 and is reflected back into itself increasing the flow turbulence and restricting gas flow reducing the velocity of the gas and the impact of the gas on activated alumina 48 and molecular sieve 30. The remaining portion and the reduced velocity portion of the high velocity feed gas passes through through-holes 64–67 to activated alumina 48 and molecular sieve 30.

FIG. 4c is a side view of deflector cap 32 through a section B—B of FIG. 4a.

Advantageously, the above-described fluid flow deflector cap is able to reduce the impact of high velocity feed gas on the molecular sieve while minimizing the impact on the flow of the exhaust gas during venting and regeneration of the molecular sieve. Thus, an asymmetric bidirectional fluid flow deflector cap has been described.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A fluid concentrator having two modes of operation: (1) for receiving a flow of fluid and restricting the flow through the concentrator and (2) for receiving a reverse flow of fluid and minimizing restriction of the flow through the concentrator, comprising:

a tube having first and second ends;

a cap attached to the first tube end and having a passage for receiving the flow of fluid from exterior of the tube in the first mode of operation and for receiving the reverse flow of fluid in the second mode of operation;

an insert inside the tube and next to the cap and having a shaped surface including at least one through-hole located off-center, wherein said insert is adapted to reduce the fluid flow velocity between the first tube end and the second tube end by a greater amount than the reverse fluid flow velocity is reduced between the second tube end and the first tube end.

2. The device as claimed in claim 1, wherein the cross-section of said shaped surface is bell-shaped.

3. The device as claimed in claim 1, wherein said shaped surface is one of parabaloidal, semi-spherical, and elliptoidal.

4. A fluid concentrator having two modes of operation: (1) for receiving, a flow of fluid and restricting the flow through the concentrator and (2) for receiving a reverse flow of fluid and minimizing restriction of the flow through the concentrator, comprising:

a tube having first and second ends;

a cap attached to the first tube end and having a passage for receiving the flow of fluid from exterior of the tube in the first mode of operation and for receiving the reverse flow of fluid in the second mode of operation;

an insert inside the tube and next to the cap and having a shaped surface including at least one through-hole located off-center further comprising:

a spring longitudinally positioned in the tube between the molecular sieve and the insert and urging the insert away from the molecular sieve;

an insert inside the tube and next to the cap and having a shaped surface including at least one through-hole located off-center.

5. The fluid concentrator as claimed in claim 4, further comprising:

spherical balls positioned in the tube between the molecular sieve and the spring.

6. The fluid concentrator as claimed in claim 5, further comprising:

a first perforated plate positioned in the tube between the molecular sieve and the spherical balls.

7. The fluid concentrator as claimed in claim 6, further comprising:

a first pad positioned in the tube between the first perforated plate and the molecular sieve.

8. The fluid concentrator as claimed in claim 6, further comprising:

a second perforated plate positioned in the tube between the spherical balls and the spring.

9. The fluid concentrator as claimed in claim 8, further comprising:

a second pad positioned in the tube between the spherical balls and the second perforated plate.

10. The fluid concentrator as claimed in claim 4, wherein said insert is adapted to reduce the fluid flow velocity is reduced between the first tube end and the second tube end by a greater amount than the reverse fluid flow velocity between the second tube end and the first tube end.

* * * * *